Dec. 23, 1924.

A. PETZ 1,520,435

COLLAR AND PROCESS OF MAKING SAME

Filed March 27, 1922

Inventor:
Adam Petz
By his Attorney
Edmond Congar Brown

Patented Dec. 23, 1924.

1,520,435

UNITED STATES PATENT OFFICE.

ADAM PETZ, OF MONTCLAIR, NEW JERSEY.

COLLAR AND PROCESS OF MAKING SAME.

Application filed March 27, 1922. Serial No. 547,088.

*To all whom it may concern:*

Be it known that I, ADAM PETZ, a citizen of the United States, and a resident of Montclair, in the county of Essex and State of New Jersey, have invented certain new and useful Improvements in Collars and Processes of Making Same, of which the following is a specification.

My invention relates to collars and processes of producing the same, particularly separable collars such as are worn in connection with shirts, and has for one of its principal objects to produce an improved form of collar, more particularly of that type which is adapted to be worn folded or turned down, and composed of a soft material.

The invention consists in the improved process of producing a collar of the kind referred to, and in the said collar, as a new article of manufacture, all as set forth in the claim forming part of this specification, one form of such process being fully explained in this specification and one form of such a collar constructed according to the invention being likewise described, and also illustrated in the accompanying drawings.

In the accompanying drawings, Fig. 1 is a perspective view of a completed collar constructed according to my invention, showing the same folded over and with the ends brought together as it appears when in position upon the neck of the wearer;

Figure 1:
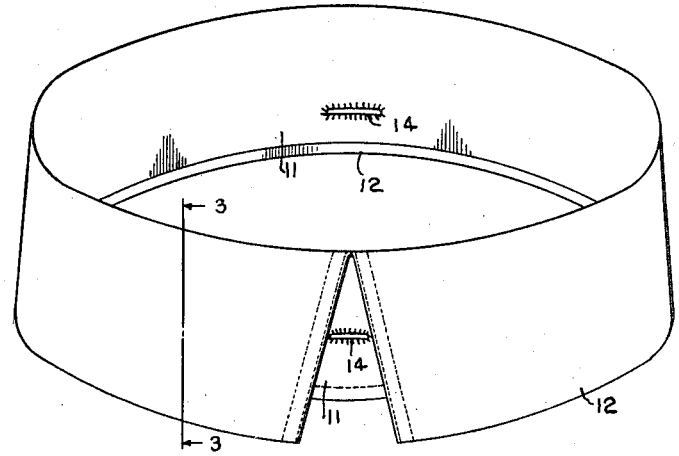
Figure 2:
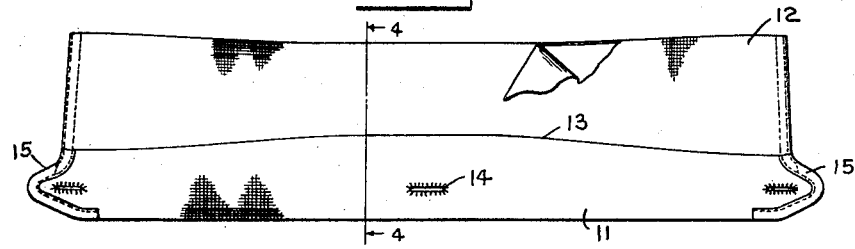
Fig. 2 is a view on a reduced scale of such a collar, showing the same unfolded and laid out flat.

My improved collars, which are produced by the process forming a part of my invention, are woven upon a loom, being delivered therefrom in a continuous strip which is thereafter cut into suitable lengths, and the ends of these lengths shaped and finished so as to present the appearance shown in Fig. 2. The part of the collar forming the neckband is of two-ply construction, the plies, however, being connected together so as to form a single fabric in the process of weaving in the usual well-understood manner. This part of the collar is designated 11. The part of the collar forming the flap or turn-over portion is likewise of two-ply construction, but the plies are not connected together, but are separate from each other so as to form a tubular structure as particularly shown in Figs. 3 and 4; this part of the collar is designated 12. The line 13 shown in Fig. 2 does not indicate a structural feature, but is merely the line indicating where the fold of the collar will be and the place where the individual plies, which are united in the portion 11, cease to be united and become separate as in the portion 12. The collar is shown having the usual buttonholes 14 and a binding or other finishing 15 over the ends.

I am aware that collars are already known in the art, produced by weaving a continuous narrow strip of material, having a plurality of plies which are united in a part of the material and separate in another part, such strip being, however, somewhat wider than the height of the collar to be formed therefrom, cutting this strip into sections of suitable length to form a collar, cutting away the edges of the strips so as to make the collar of a predetermined height and finishing the edges and ends, the junction line of the united-ply portion and the separate-ply portion, however, usually proceeding in a straight line so that when the collar is folded along this line it is not of a satisfactory shape. I am also aware that it has been suggested to so prepare the goods that this junction line is curved so as to produce a properly shaped collar. So far as I am aware, however, it is new to produce a collar by forming in the loom a continuous strip of predetermined varying width corresponding to the varying height of the collar at different parts, the fabric being two-ply throught its whole extent, but having the plies connected together in the portion forming the neckband, and separated in the portion forming the flap, and having the junction line between the two portions curved so as to produce a properly shaped collar, as shown in Fig. 2.

Figures 3, 4, 5:
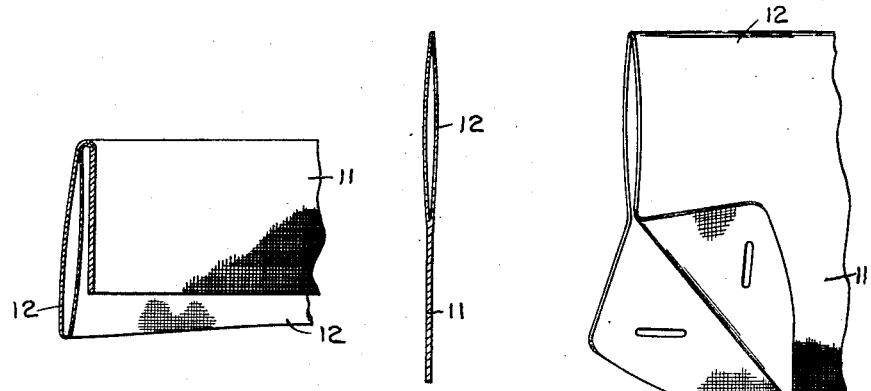
Fig. 3 is a section along the line 3—3 of Fig. 1.
Fig. 4 is a section along the line 4—4 of Fig. 2.
Fig. 5 is a fragmentary view of a modification.

In the modified form of collar shown in Fig. 5 the two plies forming the neck-band are not united during the whole of their length, but are left separate at the ends, thereby permitting the finishing of the ends to be accomplished by turning the plies inward and stitching the same, thus dispensing with the binding shown in Fig. 2.

The process by which my improved collar is produced comprises the use of a reed between the wires of which the warp threads of the fabric pass, the said reed being adapted to reciprocate transversely of the length of the warp threads, in a well-known manner. The particular form of reed which I employ is provided with one set of wires comparatively wide apart at one end, the top of the reed, and comparatively close together at the bottom of the reed, these wires being those between which pass the warp threads forming the turned-over portion of the collar, and the reed is provided with another set of wires, located laterally of the first mentioned wires, comparatively close together at the top and wide apart at the bottom, these wires being those between which pass the warp threads forming the neck-band of the collar. In the first set, the wires converge downwardly on both sides toward middle, the middle wire only being perpendicular; in the second set, the wire on the edge of the reed is perpendicular and the wires diverge downwardly therefrom and from each other.

When the reed is in its lowest position in the loom, the warp threads which are to form the turned-over portion of the collar are passing between the upper ends of the first set of wires, where they are comparatively far apart, and this part of the fabric is therefore wide, at the same time the warp threads which are to form the neckband are passing between the upper ends of the second set of wires, where they are comparatively near together, and this part of the fabric is narrow. This corresponds to the ends of the collar. As the weaving progresses, the reed is raised, and when it is raised entirely up, so that the warp threads forming the turned-over portion pass between the close together wires and the warp threads forming the neck-band pass between the more widely separated wires, the middle of the collar is produced. The reed is then again lowered, the weaving progressing meanwhile, and the other end of the collar is produced, and then the beginning of another collar, and so on as long as desired, the fabric being produced in a continuous strip and then cut up into collar lengths and the ends finished as shown in the drawings.

The advantages of my invention are self-evident. By weaving a continuous strip in the manner described, cutting the same into collar lengths and finishing the ends, it is possible to produce the collars in quantity at a minimum of time and labor, while by the use of my improved process a well shaped collar is produced which is superior to continuously-formed collars such as have been previously known.

Having thus described my invention, what I claim as new and desire to secure by Letters Patent, is as follows:

A collar formed of one piece of fabric having a plurality of plies, the plies of the turned over portion being separate from each other except at the outer edge and the plies of the neck band being woven together during the greater part of their length but being separate at the ends, the said fabric being shaped to form the collar during the process of weaving the same, and the ends of the collar being inturned and secured so as to properly close the same.

In witness whereof I have hereunto signed my name this 22d day of March 1922.

ADAM PETZ.